(12) United States Patent
Watanabe et al.

(10) Patent No.: US 11,909,515 B2
(45) Date of Patent: Feb. 20, 2024

(54) OPTICAL TRANSMISSION SYSTEM AND RECEIVING DEVICE

(71) Applicant: FUJITSU LIMITED, Kawasaki (JP)

(72) Inventors: Tomoaki Watanabe, Kawasaki (JP); Atsushi Kiyama, Kawasaki (JP); Makoto Hasegawa, Sapporo (JP); Yoshito Kachita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 52 days.

(21) Appl. No.: 17/867,057

(22) Filed: Jul. 18, 2022

(65) Prior Publication Data
US 2023/0239066 A1 Jul. 27, 2023

(30) Foreign Application Priority Data
Apr. 26, 2022 (JP) ................................. 2022-072533

(51) Int. Cl.
*H04J 14/02* (2006.01)
*G02B 6/293* (2006.01)
*G02B 6/12* (2006.01)

(52) U.S. Cl.
CPC ...... *H04J 14/0212* (2013.01); *G02B 6/12007* (2013.01); *G02B 6/293* (2013.01); *H04J 14/0217* (2013.01)

(58) Field of Classification Search
CPC .............. H04J 14/0212; H04J 14/0217; G02B 6/12007; G02B 6/293
USPC ........................................................ 398/83
See application file for complete search history.

(56) References Cited

U.S. PATENT DOCUMENTS

| 10,056,976 | B2* | 8/2018 | Satou | H04J 14/0221 |
| 10,171,163 | B2* | 1/2019 | Oda | H04B 10/07953 |
| 2006/0269284 | A1 | 11/2006 | Fujita | |
| 2008/0304829 | A1* | 12/2008 | Sato | H04J 14/0221 398/79 |
| 2012/0008957 | A1* | 1/2012 | Toyomaki | H04J 14/0227 398/83 |
| 2012/0318965 | A1* | 12/2012 | Tosaki | H04B 10/0773 250/227.11 |
| 2020/0358534 | A1* | 11/2020 | Ootaki | H04J 14/021 |
| 2022/0376784 | A1* | 11/2022 | Inoue | H04B 10/073 |

FOREIGN PATENT DOCUMENTS

| JP | 2006-333136 A | 12/2006 |
| WO | WO 2019/151067 A1 | 8/2019 |

* cited by examiner

*Primary Examiner* — Dalzid E Singh
(74) *Attorney, Agent, or Firm* — STAAS & HALSEY LLP

(57) ABSTRACT

An optical transmission system includes a transmitting node that transmits wavelength light of an operational path to an optical waveguide, and a receiving node that receives the wavelength light from the optical waveguide. The transmitting node includes a light source that generates spontaneously emitted light and a wavelength selector that generates and outputs dummy wavelength light from the spontaneously emitted light generated by the light source. The receiving node includes an extractor that extracts spectral data of the dummy wavelength light passed in the optical waveguide. The optical transmission system further includes an obtainer that obtains a band state of the operational path from the spectral data of the dummy wavelength light extracted by the extractor.

9 Claims, 14 Drawing Sheets

OPTICAL TRANSMISSION SYSTEM AND RECEIVING DEVICE

CROSS-REFERENCE TO RELATED APPLICATION

This application is based upon and claims the benefit of priority of the prior Japanese Patent Application No. 2022-072533, filed on Apr. 26, 2022, the entire contents of which are incorporated herein by reference.

FIELD

The embodiments discussed herein are related to optical transmission systems and receiving devices.

BACKGROUND

FIG. 14 is a diagram illustrating an example of a conventional optical transmission system 100. The optical transmission system 100 illustrated in FIG. 14 has a transmitting node 200A (200), a receiving node 200B (200), a relaying node 200C (200), and a control device 300. In the optical transmission system 100, for example, wavelength light having a slot width of 100 GHz of an operational path is transmitted by wavelength division multiplexing, to the receiving node 200B from the transmitting node 200A via the relaying node 200C. The optical transmission system 100 also has an optical waveguide 400 that optically connects between the transmitting node 200A and the relaying node 200C and between the relaying node 200C and the receiving node 200B, with the operational path.

The transmitting node 200A is a reconfigurable optical add/drop multiplexer (ROADM) for transmission, the ROADM being arranged on the optical waveguide 400. The transmitting node 200A has a multiplexer (MUX) 251 and a transmitting device 210A (210). The MUX 251 is connected to plural transponders TRPN and multiplexes wavelength light from the plural transponders TRPN. The transmitting device 210A has a wavelength selective switch (WSS) 211, an optical amplifier 212, an optical channel monitor (OCM) 213, a communication interface 214, an OCM control unit 215, and a WSS control unit 216.

The WSS 211 is a wavelength selective switch that transmits therethrough wavelength division multiplexed light from the MUX 251. A transmission band for the WSS 211 is set according to an instruction from the control device 300. The optical amplifier 212 optically amplifies the wavelength division multiplexed light transmitted through the WSS 211. The OCM 213 measures spectral data for each wavelength light of the wavelength division multiplexed light transmitted through the WSS 211. The OCM 213 has a tunable wavelength filter that transmits therethrough any wavelength light from the wavelength division multiplexed light and a photodiode (PD) that electrically converts the wavelength light transmitted through the tunable wavelength filter.

The communication interface 214 performs communication with the control device 300 by using a control line 500 connecting between the communication interface 214 and the control device 300. The OCM control unit 215 controls the OCM 213. The OCM control unit 215 notifies the control device 300, through the communication interface 214, of spectral data for any wavelength, the spectral data being a result of measurement by the OCM 213. The WSS control unit 216 controls the WSS 211. The WSS control unit 216 obtains a set transmission band from the control device 300 through the communication interface 214 and sets the obtained set transmission band for the WSS 211.

The receiving node 200B is a ROADM for reception, the ROADM being arranged on the optical waveguide 400. The receiving node 200B has a receiving device 220A and a DEMUX 252. The DEMUX 252 separates, from the wavelength division multiplexed light, wavelength light to be assigned to a transponder TRPN connected. The receiving device 220A has an optical amplifier 221, a WSS 222, an OCM 223, a communication interface 224, an OCM control unit 225, and a WSS control unit 226.

The optical amplifier 221 optically amplifies the wavelength division multiplexed light received through the optical waveguide 400. The WSS 222 is a wavelength selective switch that transmits therethrough the wavelength division multiplexed light that has been optically amplified. A transmission band for the WSS 222 is also set according to an instruction from the control device 300. The OCM 223 measures spectral data for each wavelength light of the wavelength division multiplexed light transmitted through the WSS 222. The OCM 223 has a tunable wavelength filter that transmits therethrough any wavelength light from the wavelength division multiplexed light and a PD that electrically converts the wavelength light transmitted through the tunable wavelength filter.

The communication interface 224 performs communication with the control device 300 by using a control line 500 connecting between the communication interface 224 and the control device 300. The OCM control unit 225 controls the OCM 223. The OCM control unit 225 notifies the control device 300, through the communication interface 224, of spectral data for any wavelength, the spectral data being a result of measurement by the OCM 223. The WSS control unit 226 controls the WSS 222. The WSS control unit 226 obtains a set transmission band from the control device 300 through the communication interface 224 and sets the obtained set transmission band for the WSS 222.

The relaying node 200C is a ROADM for relaying, the ROADM being arranged on the optical waveguide 400 between the transmitting node 200A and the receiving node 200B. The relaying node 200C has a receiving device 220B and a transmitting device 210B. The receiving device 220B also has an optical amplifier 221, a WSS 222, an OCM 223, a communication interface 224, an OCM control unit 225, and a WSS control unit 226. The receiving device 220B has the same configuration as the receiving device 220A. The transmitting device 210B also has a WSS 211, an optical amplifier 212, an OCM 213, a communication interface 214, an OCM control unit 215, and a WSS control unit 216. The transmitting device 210B has the same configuration as the transmitting device 210A.

The control device 300 monitors and controls the transmitting node 200A, the receiving node 200B, and the relaying node 200C. The control device 300 has a communication interface 310, a storage unit 320, and a control unit 330. The communication interface 310 performs, by using the control lines 500, communication with the transmitting device 210A at the transmitting node 200A, the transmitting device 210B and the receiving device 220B at the relaying node 200C, and the receiving device 220A at the receiving node 200B. The storage unit 320 stores therein various types of information. The control unit 330 controls the overall control device 300. The control unit 330 has a setting unit 331 and a monitoring unit 332. By using the control line 500, the setting unit 331 sets any transmission band for the WSS 211 in the transmitting device 210A at the transmitting node 200A. The setting unit 331 also sets any transmission band for the WSS 211 in the transmitting device 210B and for the WSS 222 in the receiving device 220B, both at the relaying node 200C. The setting unit 331 also sets any transmission band for the WSS 222 in the receiving device 220A at the receiving node 200B. By using the control line 500, the monitoring unit 332 monitors results of measurement by the OCM 213 in the transmitting device 210A at the transmitting node 200A. The monitoring unit 332 also monitors results of measurement by the OCM 213 in the transmitting device 210B and by the OCM 223 in the receiving device 220B, both at the relaying node 200C. The monitoring unit 332 also monitors results of measurement by the OCM 223 in the receiving device 220A at the receiving node 200B.

In this conventional optical transmission system 100, the transponders TRPN are connected and wavelength light on the operational path emitted from the transponders TRPN is used, for obtainment of power of the wavelength light on the operational path for communication through the optical waveguide 400 between the transmitting node 200A and the receiving node 200B. As a result, the control device 300 is able to recognize power of the wavelength light on the operational path and a state of communication between the transmitting node 200A and the receiving node 200B.

Patent Literature 1: International Publication Pamphlet No. WO 2019/151067

Patent Literature 2: Japanese Laid-open Patent Publication No. 2006-333136

However, in a state where the transponders TRPN have not been connected, the conventional optical transmission system 100 does not enable obtainment of, not only the power of wavelength light on the operational path for communication through the optical waveguide 400 between the transmitting node 200A and the receiving node 200B, but also the band state of the operational path. The band state of the operational path is particularly an important index for evaluation of communication through the operational path.

SUMMARY

According to an aspect of an embodiment, an optical transmission system includes a transmitting node that transmits wavelength light of an operational path to an optical waveguide and a receiving node that receives the wavelength light from the optical waveguide. The transmitting node includes a light source that generates spontaneously emitted light and a wavelength selector that generates and outputs dummy wavelength light from the spontaneously emitted light generated by the light source. The receiving node includes an extractor that extracts spectral data of the dummy wavelength light passed in the optical waveguide. The optical transmission system further includes an obtainer that obtains a band state of the operational path from the spectral data of the dummy wavelength light extracted by the extractor.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. Techniques disclosed herein are not limited by these embodiments. Furthermore, the following embodiments may be combined with one another as appropriate so long as no contradiction is caused by the combination.

[a] First Embodiment

Figure 1:
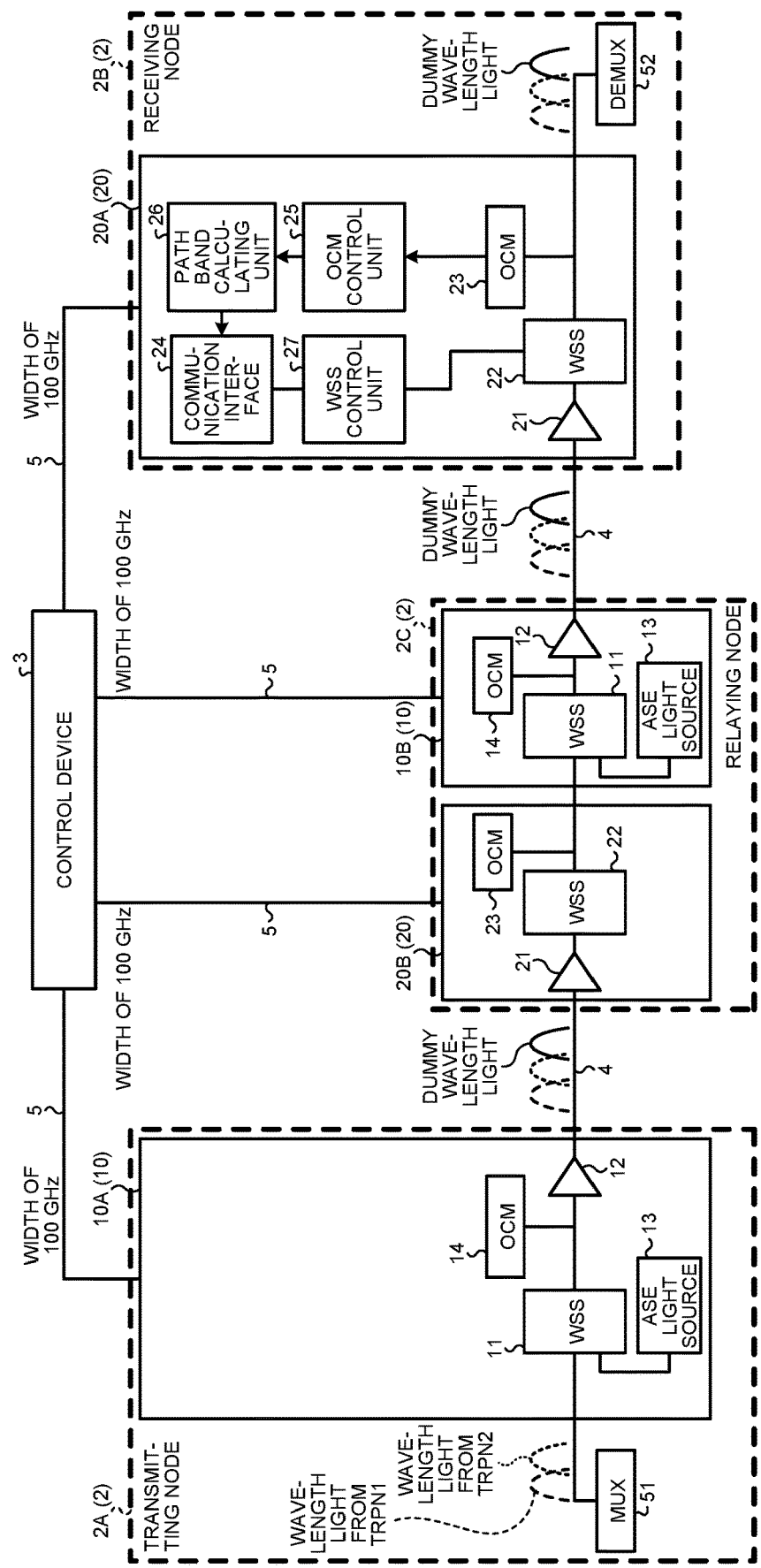
FIG. 1 is a diagram illustrating an example of an optical transmission system according to a first embodiment.

FIG. 1 is a diagram illustrating an example of an optical transmission system 1 according to a first embodiment. The optical transmission system 1 illustrated in FIG. 1 includes a transmitting node 2A (2), a receiving node 2B (2), a relaying node 2C (2), and a control device 3. In the optical transmission system 1, for example, wavelength light having a slot width of 100 GHz of an operational path is transmitted by wavelength division multiplexing, to the receiving node 2B from the transmitting node 2A via the relaying node 2C. The optical transmission system 1 also includes an optical waveguide 4 that optically connects, with the operational path, between the transmitting node 2A and the relaying node 2C and between the relaying node 2C and the receiving node 2B.

Figure 2:
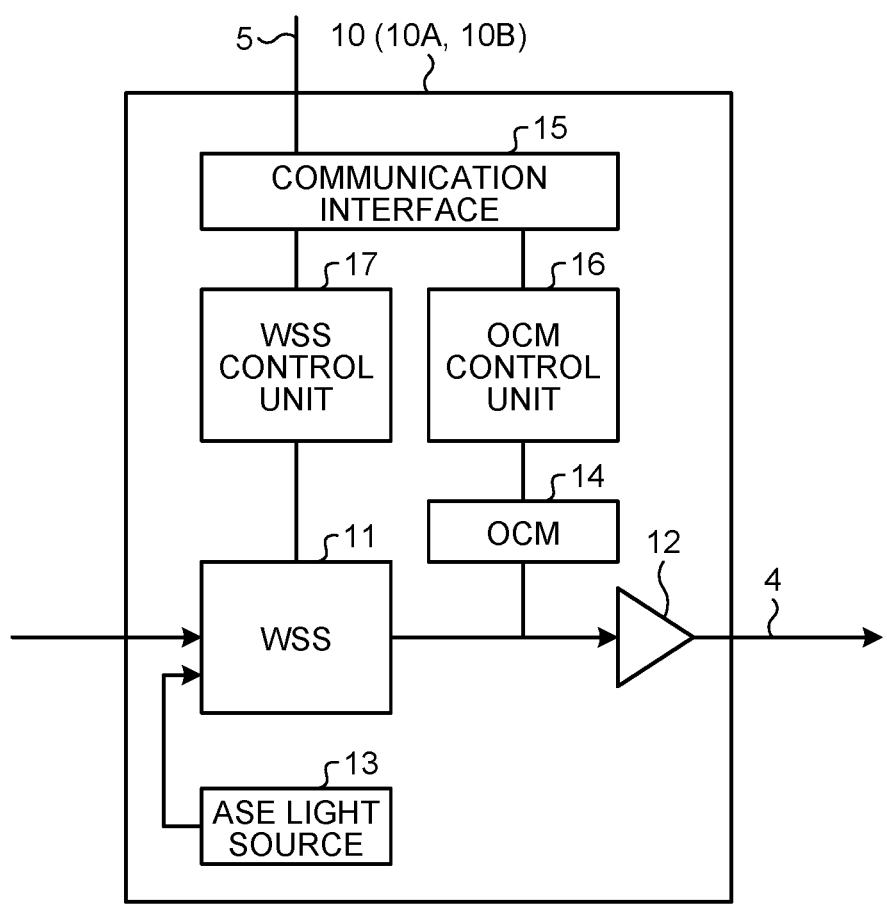
FIG. 2 is a diagram illustrating an example of a transmitting device.

The transmitting node 2A is a reconfigurable optical add/drop multiplexer (ROADM) for transmission, the ROADM being arranged on the optical waveguide 4. The transmitting node 2A includes a multiplexer (MUX) 51 and a transmitting device 10A (10). The MUX 51 is connected to plural transponders TRPN and multiplexes wavelength light from the plural transponders TRPN. FIG. 2 is a diagram illustrating an example of the transmitting device 10A. The transmitting device 10A illustrated in FIG. 2 includes a wavelength selective switch (WSS) 11, an optical amplifier 12, an amplified spontaneous emission (ASE) light source 13, an optical channel monitor (OCM) 14, and a communication interface 15. The transmitting device 10A also includes an OCM control unit 16 and a WSS control unit 17.

The WSS 11 is a wavelength selective unit that transmits therethrough wavelength division multiplexed light from the MUX 51. The selective switch is a selector. A transmission band for the WSS 11 is set according to an instruction from the control device 3. The optical amplifier 12 optically amplifies the wavelength division multiplexed light transmitted through the WSS 11. The ASE light source 13 is a light source that emits ASE light. The OCM 14 is an extracting unit that measures spectral data for each wavelength light of the wavelength division multiplexed light transmitted through the WSS 11. The extracting unit is an extractor. The OCM 14 is a coherent OCM that extracts spectral data (optical power) for dummy wavelength light, by utilizing optical coherent interference. The OCM 14 is a high performance OCM having higher resolving power than the conventional OCM 213 and OCM 223 (see, for example, the specification of U.S. patent Ser. No. 09/490,895).

The communication interface 15 performs communication with the control device 3 by using a control line 5 connecting between the communication interface 15 and the control device 3. The OCM control unit 16 controls the OCM 14. The OCM control unit 16 notifies the control device 3, through the communication interface 15, of spectral data for any wavelength, the spectral data being a result of measurement by the OCM 14. The WSS control unit 17 controls the WSS 11. The WSS control unit 17 obtains a set transmission band from the control device 3 through the communication interface 15 and sets the obtained set transmission band for the WSS 11.

Figure 3:
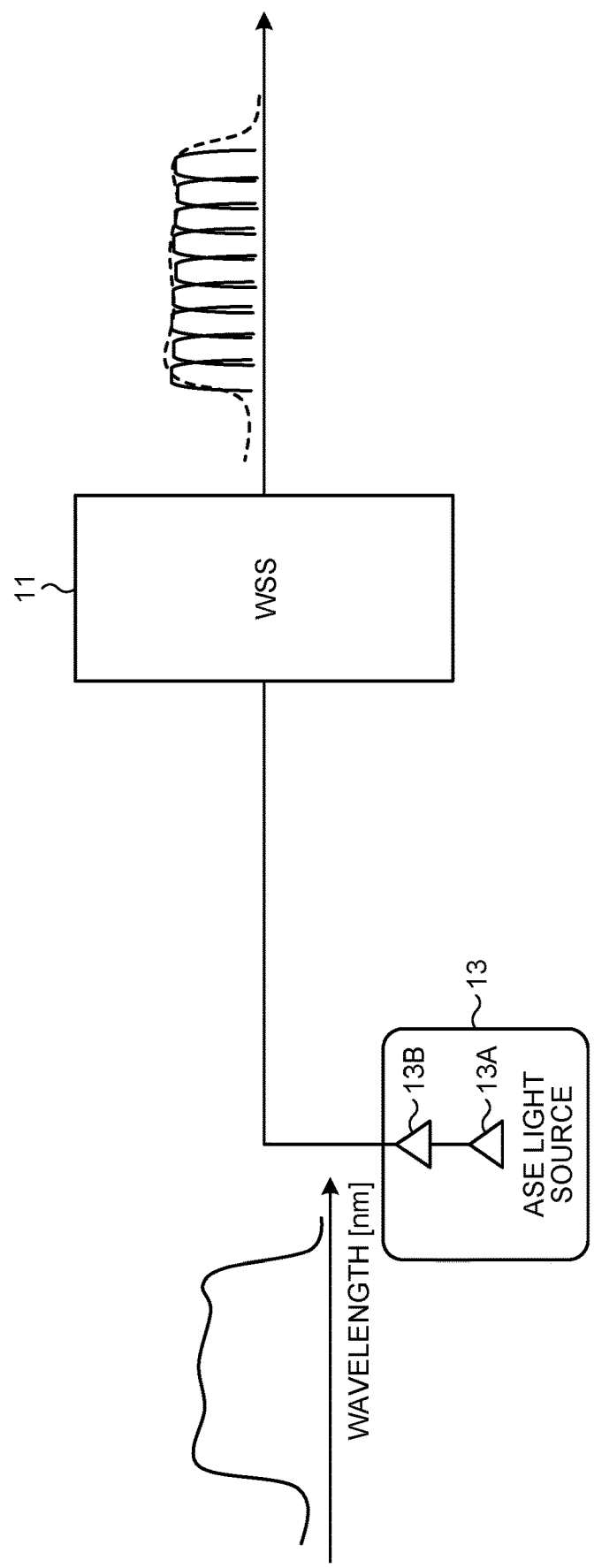
FIG. 3 is a diagram illustrating an example of a method of generating dummy wavelength light.

FIG. 3 is a diagram illustrating an example of a method of generating dummy wavelength light. The ASE light source 13 illustrated in FIG. 3 includes a first optical amplifier 13A without input and a second optical amplifier 13B that optically amplifies output of the first optical amplifier 13A, the first optical amplifier 13A and the second optical amplifier 13B being connected in series. The ASE light source 13 outputs broadband ASE light by adjustment of gain of the second optical amplifier 13B. The WSS 11 receives the broadband ASE light from the ASE light source 13 and transmits therethrough and outputs dummy wavelength light imitating wavelength light of the transponders TRPN.

Figure 4:
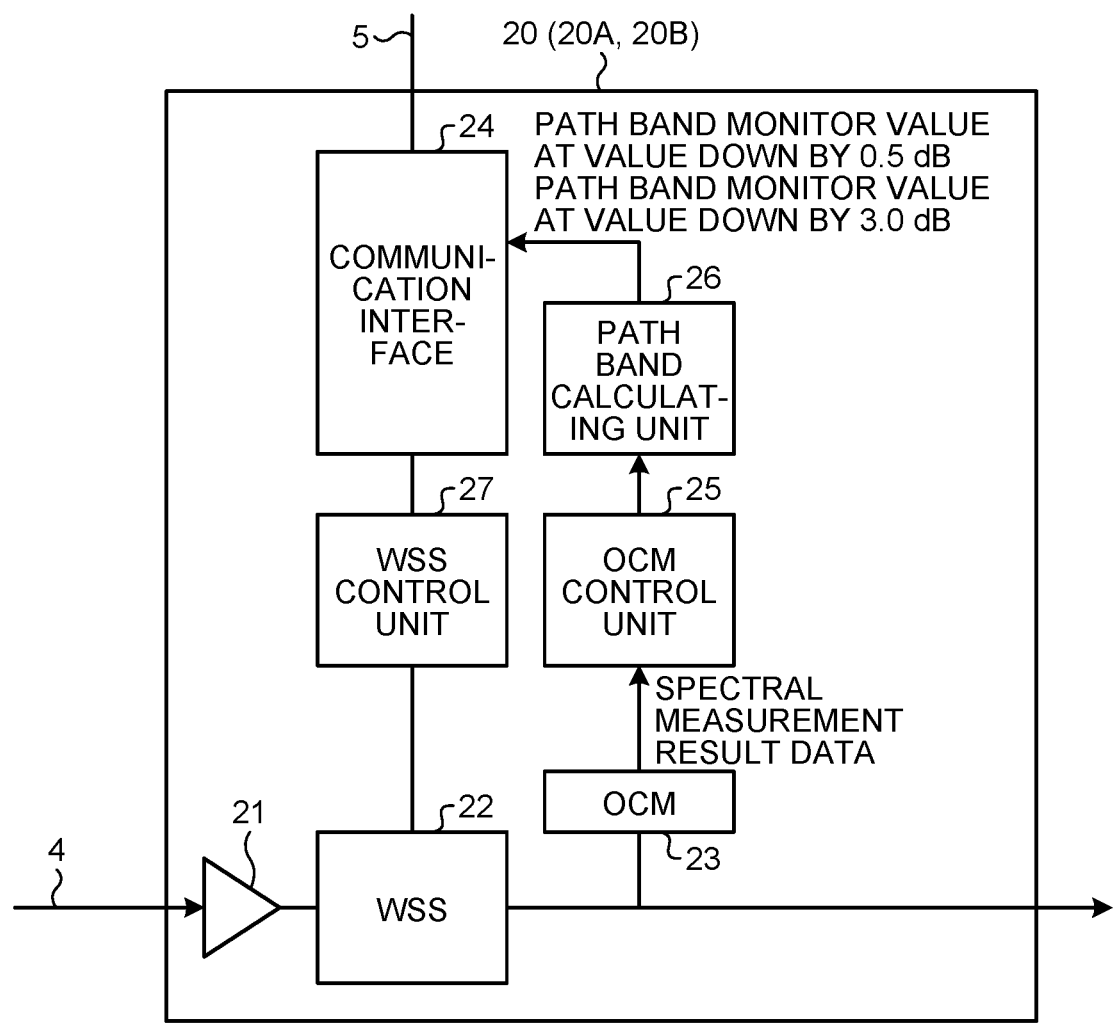
FIG. 4 is a diagram illustrating an example of a receiving device.

The receiving node 2B is a ROADM for reception, the ROADM being arranged on the optical waveguide 4. The receiving node 2B includes a receiving device 20A (20) and a DEMUX 52. The DEMUX 52 separates, from wavelength division multiplexed light, wavelength light to be assigned to a transponder TRPN connected. FIG. 4 is a diagram illustrating an example of the receiving device 20A. The receiving device 20A illustrated in FIG. 4 includes an optical amplifier 21, a WSS 22, an OCM 23, a communication interface 24, an OCM control unit 25, a path band calculating unit 26, and a WSS control unit 27.

The optical amplifier 21 optically amplifies wavelength division multiplexed light received through the optical waveguide 4. The WSS 22 is a wavelength selective switch that transmits therethrough the wavelength division multiplexed light that has been optically amplified. A transmission band for the WSS 22 is also set according to an instruction from the control device 3. The OCM 23 measures spectral data for each wavelength light of the wavelength division multiplexed light transmitted through the WSS 22. The OCM 23 is a coherent OCM that extracts spectral data for the dummy wavelength light, by utilizing optical coherent interference.

The communication interface 24 performs communication with the control device 3 by using a control line 5 connecting between the communication interface 24 and the control device 3. The OCM control unit 25 controls the OCM 23. The OCM control unit 25 obtains spectral data for the dummy wavelength light, the spectral data being a result of measurement by the OCM 23. The path band calculating unit 26 is an obtaining unit that calculates path band monitor values representing a band state of the operational path, from the spectral data for the dummy wavelength light. The obtaining unit is an obtainer. The path band calculating unit 26 notifies the control device 3 of the path band monitor values, by using the control line 5.

The WSS control unit 27 controls the WSS 22. The WSS control unit 27 obtains a set transmission band from the control device 3 through the communication interface 24 and sets the obtained set transmission band for the WSS 22.

Figure 5:
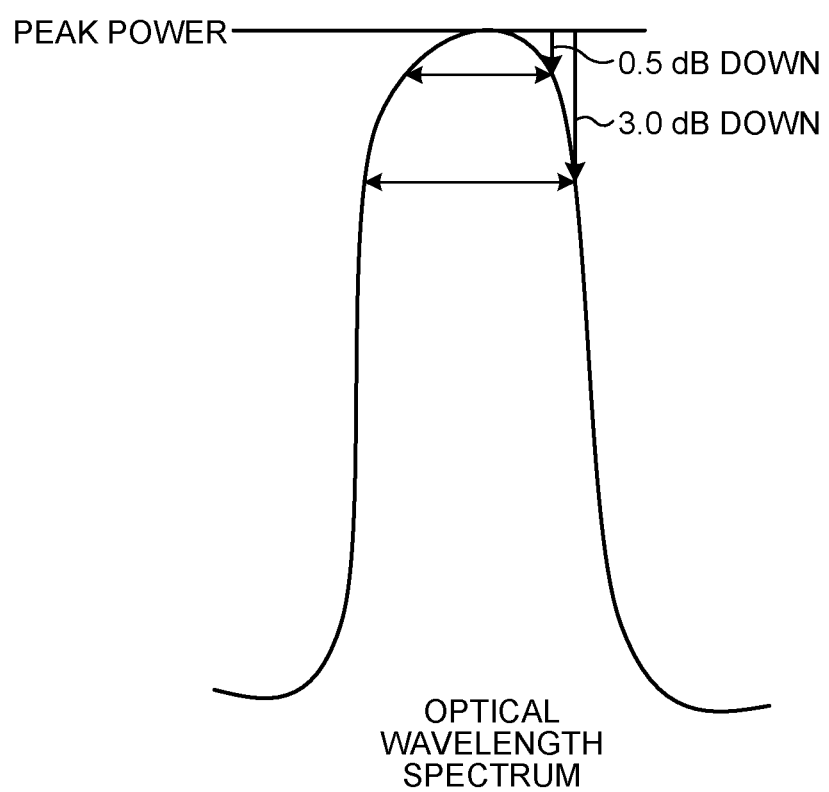
FIG. 5 is a diagram illustrating an example of a path band.

FIG. 5 is a diagram illustrating an example of a path band. The path band calculating unit 26 calculates, as illustrated in FIG. 5, a path band width at a value 0.5 dB down from peak power of the spectrum of the dummy wavelength light and a path band width at a value 3.0 dB down from the peak power.

The relaying node 2C is a ROADM for relaying, the ROADM being arranged on the optical waveguide 4 between the transmitting node 2A and the receiving node 2B. The relaying node 2C includes a receiving device 20B and a transmitting device 10B. The receiving device 20B also includes an optical amplifier 21, a WSS 22, an OCM 23, a communication interface 24, an OCM control unit 25, a path band calculating unit 26, and a WSS control unit 27. The receiving device 20B has the same configuration as the receiving device 20A. The transmitting device 10B also has a WSS 11, an optical amplifier 12, an ASE light source 13, an OCM 14, a communication interface 15, an OCM control unit 16, and a WSS control unit 17. The transmitting device 10B has the same configuration as the transmitting device 10A.

Figure 6:
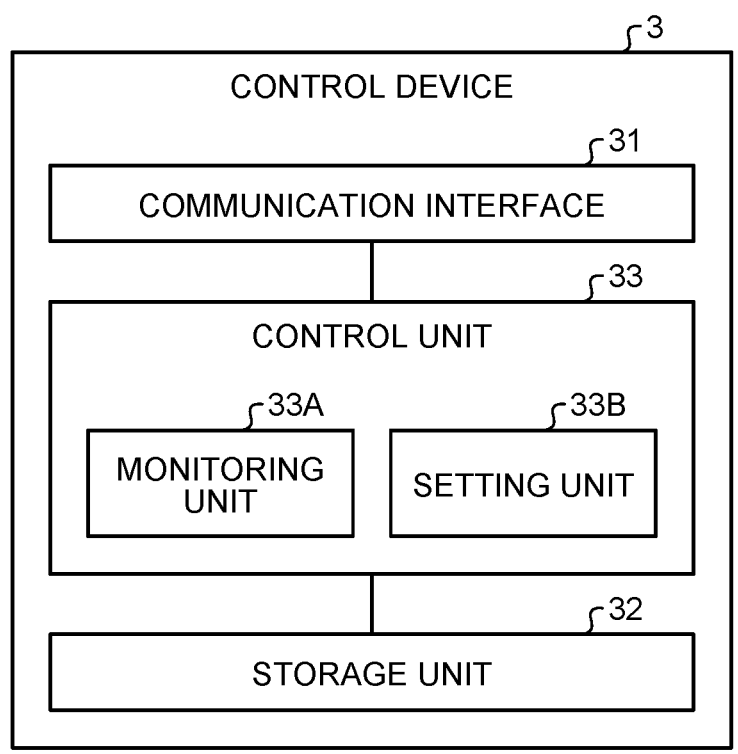
FIG. 6 is a diagram illustrating an example of a control device.

FIG. 6 is a diagram illustrating an example of the control device 3. The control device 3 illustrated in FIG. 6 monitors and controls the transmitting node 2A, the receiving node 2B, and the relaying node 2C. The control device 3 includes a communication interface 31, a storage unit 32, and a control unit 33. By using the control lines 5, the communication interface 31 performs communication with the transmitting device 10A at the transmitting node 2A, the transmitting device 10B and the receiving device 20B both at the relaying node 2C, and the receiving device 20A at the receiving node 2B. The storage unit 32 stores therein various types of information. The control unit 33 controls the overall control device 3. The control unit 33 includes a monitoring unit 33A and a setting unit 33B. By using the control lines 5, the setting unit 33B sets any transmission band for the WSS 11 in the transmitting device 10A at the transmitting node 2A, the WSS11 in the transmitting device 10B and the WSS 22 in the receiving device 20B both at the relaying node 2C, and the WSS 22 in the receiving device 20A at the receiving node 2B. By using the control lines 5, the monitoring unit 33A receives path band monitor values from the path band calculating unit 26 in the receiving device 20A at the receiving node 2B and the path band calculating unit 26 in the receiving device 20B at the relaying node 2C, and evaluates, on the basis of the path band monitor values received, the band state of the operational path.

In a state where no transponders TRPN have been connected in the optical transmission system 1, the control device 3 obtains a band state of the operational path between the transmitting node 2A and the receiving node 2B, by using the dummy wavelength light on the operational path, the dummy wavelength light being emitted from the ASE light source 13. Furthermore, the control device 3 displays path band monitor values on a display unit not illustrated in the drawings, the path band monitor values representing the obtained band state of the operational path. As a result, before installation of any transponders TRPN, a user of the control device 3 is able to evaluate the state of communication through the operational path to be connected, by referring to the path band monitor values for the operational path.

Figure 7:
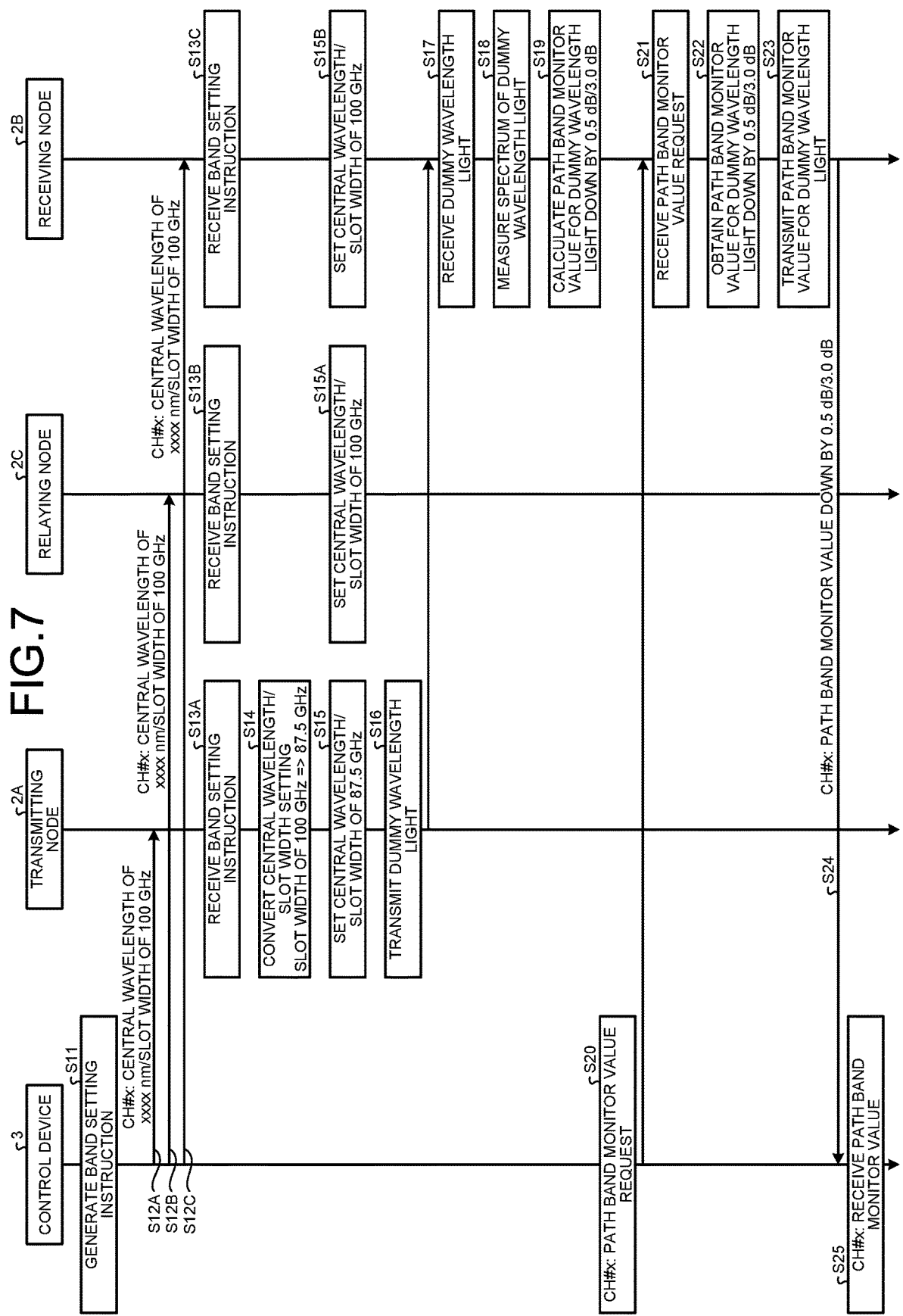
FIG. 7 is a sequence diagram illustrating an example of processing operation in the optical transmission system, the processing operation being related to path band monitoring processing according to the first embodiment.

Operation of the optical transmission system 1 according to the first embodiment will be described next. FIG. 7 is a sequence diagram illustrating an example of processing operation in the optical transmission system 1, the processing operation being related to path band monitoring processing according to the first embodiment. The path band monitoring processing illustrated in FIG. 7 is processing of transmitting, from the transmitting device 10A at the transmitting node 2A, the dummy wavelength light from the ASE light source 13 and monitoring band states of the dummy wavelength light in the receiving device 20A at the receiving node 2B. For convenience of explanation, it is assumed that no transponders TRPN have been connected to the transmitting node 2A and the receiving node 2B in the optical transmission system 1.

The control device 3 generates a band setting instruction for a channel to be monitored (Step S11). The band setting instruction is a command for setting, for the WSS 11 and WSS 22 at the nodes 2, a transmission band where the dummy wavelength light is transmitted through, the dummy wavelength light corresponding to the channel to be monitored. The band setting instruction corresponds to a central wavelength and a slot width of the dummy wavelength light. The slot width is set as a first slot width to be used during operation, for example, at 100 GHz.

By using the control line 5, the control device 3 transmits the band setting instruction for the channel to be monitored, to the transmitting node 2A in the optical transmission system 1 (Step S12A). Furthermore, by using a control line 5, the control device 3 transmits the band setting instruction for the channel to be monitored, to the relaying node 2C in the optical transmission system 1 (Step S12B). In addition, by using the control line 5, the control device 3 transmits the band setting instruction for the channel to be monitored, to the receiving node 2B in the optical transmission system 1 (Step S12C).

In a case where the band setting instruction is received at the transmitting node 2A from the control device 3 by use of the control line 5 (Step S13A), the first slot width of the central wavelength in the band setting instruction is converted to a second slot width at the transmitting node 2A (Step S14). The second slot width is 87.5 GHz, which is narrower by 12.5 GHz than 100 GHz, which is set for operation. The second slot width enables: simulation of the spectrum of wavelength light from transponders TRPN in operation; and minimization of overlap between adjacent wavelengths in a case where plural wavelengths are output. Furthermore, the transmitting node 2A sets the converted central wavelength and second slot width for the WSS 11 (Step S15). As a result, the WSS 11 at the transmitting node 2A will transmit therethrough and output the dummy wavelength light having the second slot width of 87.5 GHz around the central wavelength, from the ASE light.

Furthermore, in a case where the band setting instruction is received at the relaying node 2C from the control device 3 by use of the control line 5 (Step S13B), the central wavelength and the first slot width in the band setting instruction are set for the WSS 11 and WSS 22 at the relaying node 2C (Step S15A). The first slot width is, for example, 100 GHz, which is used upon operation. As a result, the WSS 11 and WSS 22 at the relaying node 2C will transmit therethrough the dummy wavelength light.

Furthermore, in a case where the band setting instruction is received at the receiving node 2B from the control device 3 by use of the control line 5 (Step S13C), the central wavelength and the first slot width in the band setting instruction are set for the WSS 22 at the receiving node 2B (Step S15B). As a result, the WSS 22 at the receiving node 2B will transmit therethrough the dummy wavelength light.

After the transmission band having the central wavelength and the second slot width has been set for the WSS 11 at the transmitting node 2A at Step S15, the ASE light from the ASE light source 13 is transmitted through the WSS 11 and the dummy wavelength light is thereby generated and transmitted to the optical waveguide 4 (Step S16).

In a case where the dummy wavelength light is received from the transmitting node 2A through the optical waveguide 4 (Step S17), the OCM control unit 25 at the receiving node 2B measures and obtains spectral data for the dummy wavelength light through the OCM 23 (Step S18).

On the basis of the spectral data for the dummy wavelength light obtained from the OCM control unit 25, the path band calculating unit 26 at the receiving node 2B calculates path band monitor values at values 0.5 dB and 3.0 dB down from the peak of the dummy wavelength light (Step S19). By using the control line 5, the control device 3 notifies the receiving node 2B of a path band monitor value request for the channel to be monitored (Step S20).

In a case where the path band monitor value request is received at the receiving node 2B by use of the control line 5 (Step S21), the path band monitor values at the values down by 0.5 dB and 3.0 dB for the channel to be monitored are obtained (Step S22). By use of the control line 5, the path band monitor values for the dummy wavelength light of the channel to be monitored are transmitted from the receiving node 2B to the control device 3 by use of the control line 5 (Steps S23 and S24).

In a case where the path band monitor values for the channel to be monitored are received at the control device 3 by use of the control line 5 (Step S25), the processing operation illustrated in FIG. 7 is ended. As a result, the path band monitor values for the channel to be monitored are obtained at the control device 3. On the basis of the path band monitor values for the channel to be monitored corresponding to the dummy wavelength light, the control device 3 is able to evaluate the state of communication through the operational path even before installation of transponders.

Figure 8:
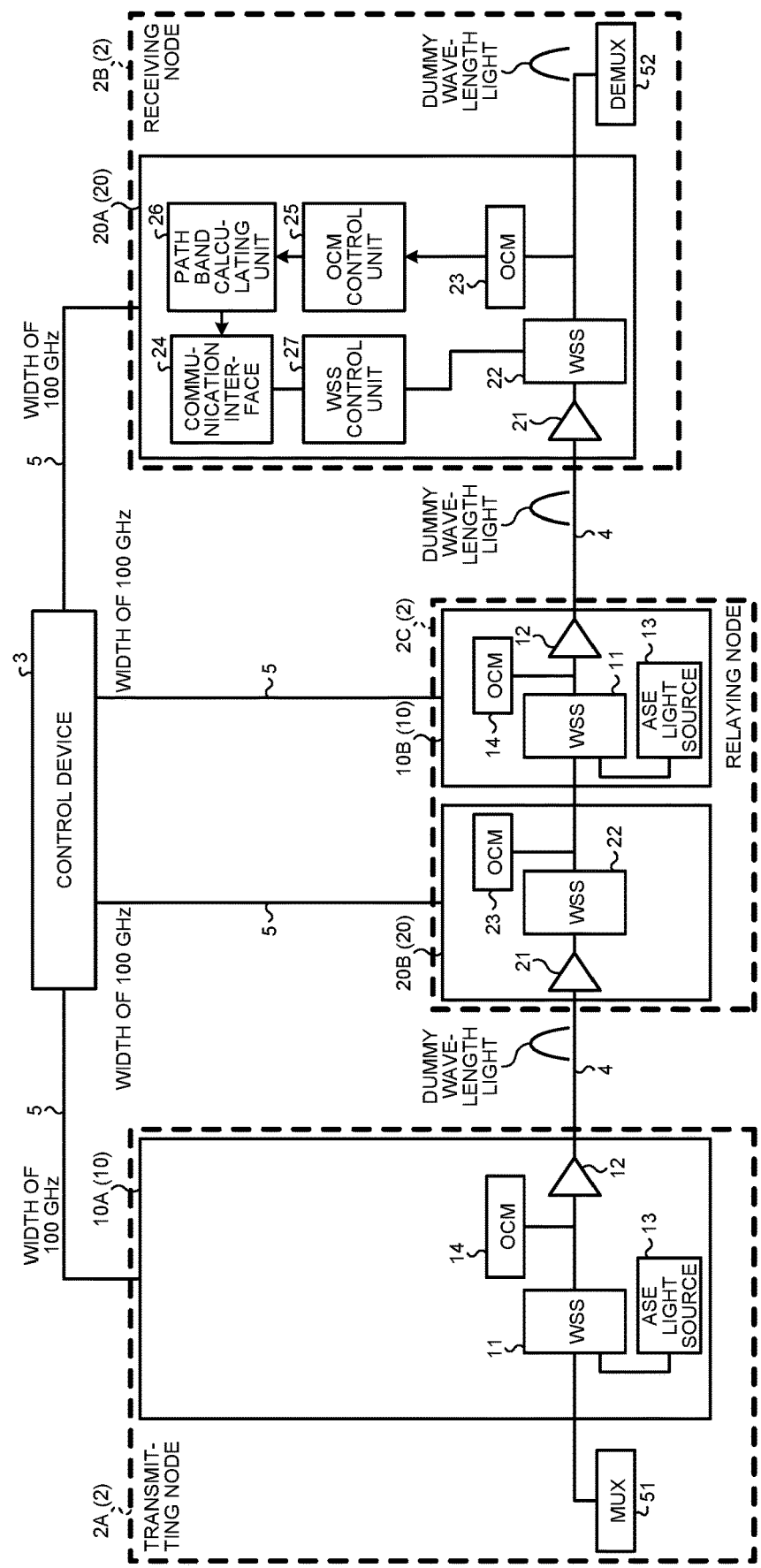
FIG. 8 is a diagram illustrating an example of the optical transmission system where transponders have not been installed and a path band of the dummy wavelength light is monitored.

FIG. 8 is a diagram illustrating an example of the optical transmission system 1 where transponders TRPN have not been installed and a path band of the dummy wavelength light is monitored. The transponders TRPN have not been connected to the transmitting node 2A and the receiving node 2B therein. The WSS 11 at the transmitting node 2A generates and outputs dummy wavelength light from the ASE light emitted by the ASE light source 13 even in a state where the transponders TRPN have not been connected yet. Spectral data for the dummy wavelength light is then obtained at the receiving node 2B through the WSS 22, path band monitor values are obtained from the spectral data for the dummy wavelength light, and the control device 3 is notified of the path band monitor values. As a result, the control device 3 is able to obtain the path band monitor values for the dummy wavelength light of the operational path even in a case where the transponders TRPN have not been connected.

In a case where the path band monitor values are worse than reference values, for example, in a case where the band width has narrowed, the control device 3 will start operation by decreasing the bit rate after installation of the transponders TRPN. The control device 3 may start the operation by selecting, from the beginning, transponders TRPN low in bit rate.

In a case where the path band monitor values are equal to or greater than the reference values, for example, in a case where the band width has not narrowed much, the control device 3 starts operation by increasing the bit rate. The control device 3 may start the operation by selecting, from the beginning, transponders TRPN supporting high bit rates.

An example of the case where the control device 3 obtains path band monitor values for the operational path has been described above, but the communication performance of the operational path may be evaluated by combination of any of path band monitor values, an optical signal to noise ratio, and FiberIn power. The control device 3 may evaluate the communication performance of the operational path by, for example, inputting the path band monitor values, optical signal to noise ratio, and/or FiberIn power into a transmission designing tool.

Figure 9:
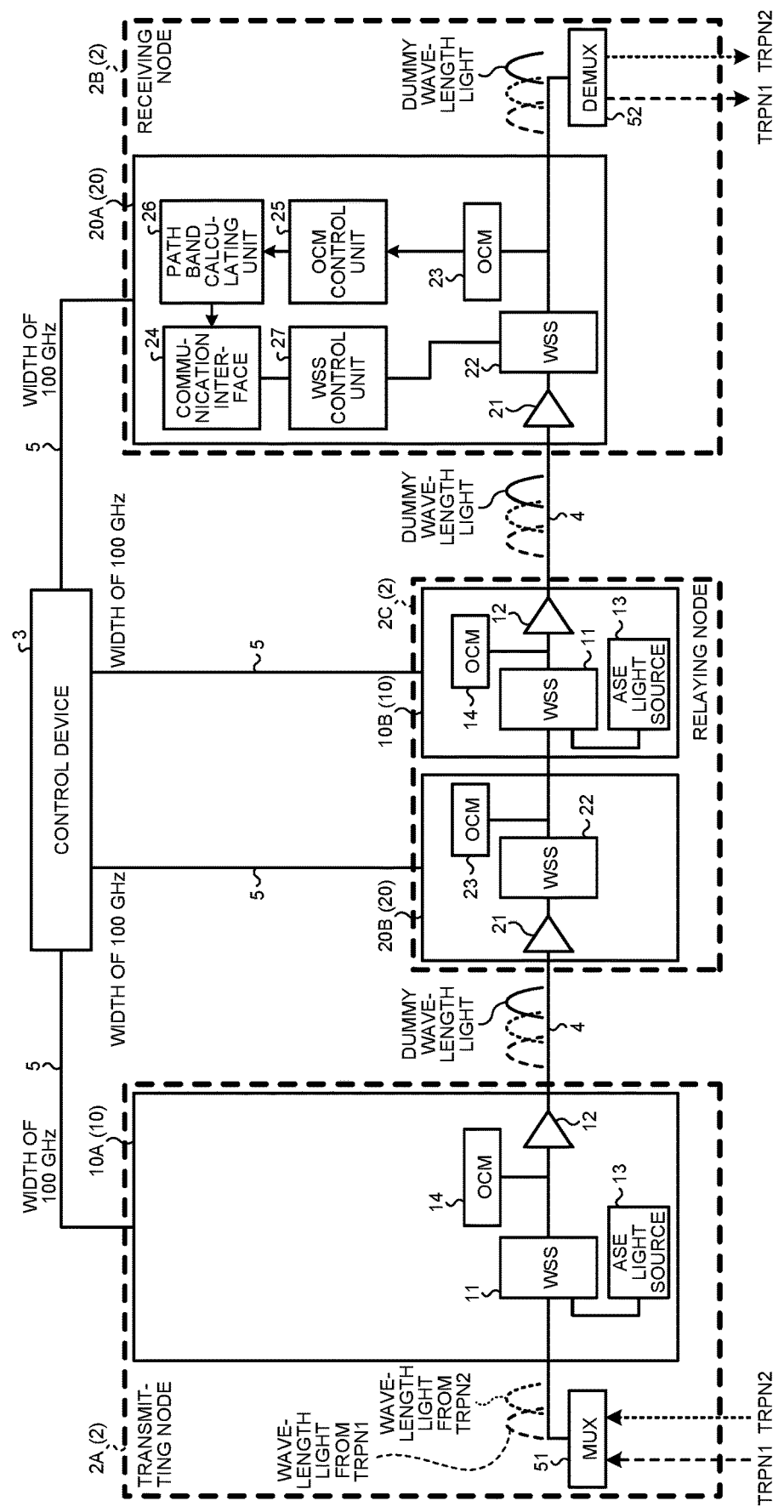
FIG. 9 is a diagram illustrating an example of the optical transmission system where a path band of the dummy wavelength light is monitored, the optical transmission system being in operation with transponders installed therein.

FIG. 9 is a diagram illustrating an example of the optical transmission system 1 where a path band of the dummy wavelength light is monitored, the optical transmission system 1 being in operation with transponders TRPN installed therein. The transmitting node 2A and the receiving node 2B have been connected to transponders TRPN and in operation. The WSS 11 at the transmitting node 2A generates and outputs dummy wavelength light that has not been used and that is different from wavelength light in use by the transponders TRPN even in the state where the transponders TRPN have been connected and in operation. The receiving node 2B then obtains spectral data for the dummy wavelength light through the WSS 22, obtains path band monitor values from the spectral data for the dummy wavelength light, and notifies the control device 3 of the path band monitor values. As a result, through the obtainment, even during operation, of the path band monitor values for the dummy wavelength light that is wavelength light that has not been used, the control device 3 is able to recognize beforehand, before further installation of any new transponder TRPN, the pass band monitor values for the wavelength light that has not been used.

The transmitting node 2A according to the first embodiment has the WSS 11 that generates dummy wavelength light from the ASE light emitted by the ASE light source 13 and that outputs the dummy wavelength light. The OCM 23 at the receiving node 2B extracts spectral data for the dummy wavelength light passed in the optical waveguide 4, and pass band monitor values for the operational path are calculated from the spectral data for the dummy wavelength light. As a result, in a state where no transponders have been connected, the path band monitor values for the operational path are able to be obtained.

The receiving node 2B has the path band calculating unit 26. As a result, the calculation processing load on the control device 3 is able to be reduced.

The OCM 23 extracts the spectral data for the dummy wavelength light, by utilizing optical coherent interference. As a result, the OCM 23 is able to obtain the spectral data for the dummy wavelength light highly accurately.

The path band calculating unit 26 obtains a band state represented by band widths at values down by predetermined values from the peak of the spectral data for the dummy wavelength light, band widths at values 0.5 dB down and 3.0 dB down from the peak. As a result, communication performance of the operational path of the ROADM is able to be evaluated from the band widths serving as an index for communication evaluation of the ROADM.

The WSS 11 generates dummy wavelength light having the second slot width narrower than the first slot width of wavelength light, from the ASE light emitted by the ASE light source 13. This enables: simulation of the spectrum of wavelength light from the operated transponders TRPN; and minimization of overlap between adjacent wavelengths in a case where plural wavelengths are output.

For convenience of explanation, dummy wavelength light having a single central wavelength of a channel to be monitored has been described as an example, but this example may be modified as appropriate. For example, a channel to be monitored may correspond to dummy wavelength light having plural central wavelengths.

The case where the path band monitor values for the operational path between the transmitting node 2A and the receiving node 2B are obtained has been described as an example. However, the path band calculating unit 26 in the receiving device 20B at the relaying node 2C may calculate path band monitor values for the dummy wavelength light. As a result, path band monitor values for the operational path between the transmitting node 2A and the relaying node 2C are able to be obtained. Furthermore, the WSS 11 in the transmitting device 10B at the relaying node 2C may generate dummy wavelength light from the ASE light and the path band calculating unit 26 in the receiving device 20A may calculate path band monitor values for the dummy wavelength light. As a result, path band monitor values for the operational path between the relaying node 2C and the receiving node 2B are able to be obtained.

The monitoring unit 33A may obtain results of measurement by the OCM 14 in the transmitting device 10A at the transmitting node 2A, the OCM 14 in the transmitting device 10B and the OCM 23 in the receiving device 20B both at the relaying node 2C, and the OCM 23 in the receiving device 20A at the receiving node 2B, by using the control lines 5. In this case, without connection of any transponders TRPN in the optical transmission system 1, the control device 3 is able to obtain the power of wavelength light of the operational path between the transmitting node 2A and the receiving node 2B, by using the dummy wavelength light on the operational path emitted from the ASE light source 13.

In the above described example, the receiving device 20 according to the first embodiment has, built therein, the path band calculating unit 26 that calculates, on the basis of spectral data for the dummy wavelength light, path band monitor values at values 0.5 dB and 3.0 dB down from the peak and the control device 3 is notified of the path band monitor values calculated. However, instead of the receiving device 20, the control device 3 may have the path band calculating unit 26 build therein. Such an example will be described hereinafter as a second embodiment.

[b] Second Embodiment

Figure 10:
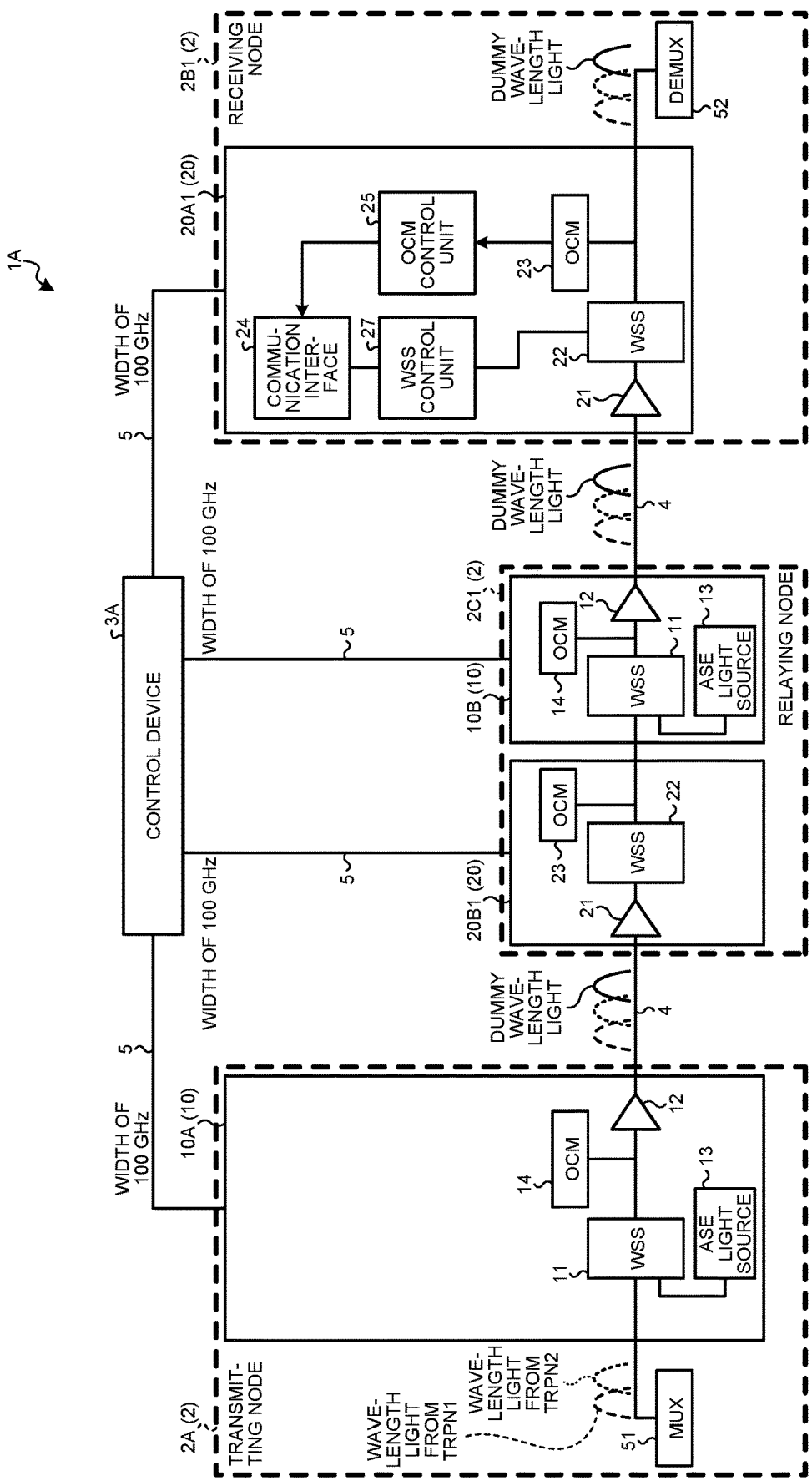
FIG. 10 is a diagram illustrating an example of an optical transmission system according to a second embodiment.

FIG. 10 is a diagram illustrating an example of an optical transmission system 1A according to the second embodiment. By assignment of the same reference signs to components that are the same as those of the optical transmission system 1 according to the first embodiment, description of the same components and operation thereof will be omitted. The optical transmission system 1A illustrated in FIG. 10 is different from the optical transmission system 1 according to the first embodiment in that instead of a receiving device 20A1, a control device 3A in the optical transmission system 1A has, built therein, a path band calculating unit 33C.

Figure 11:
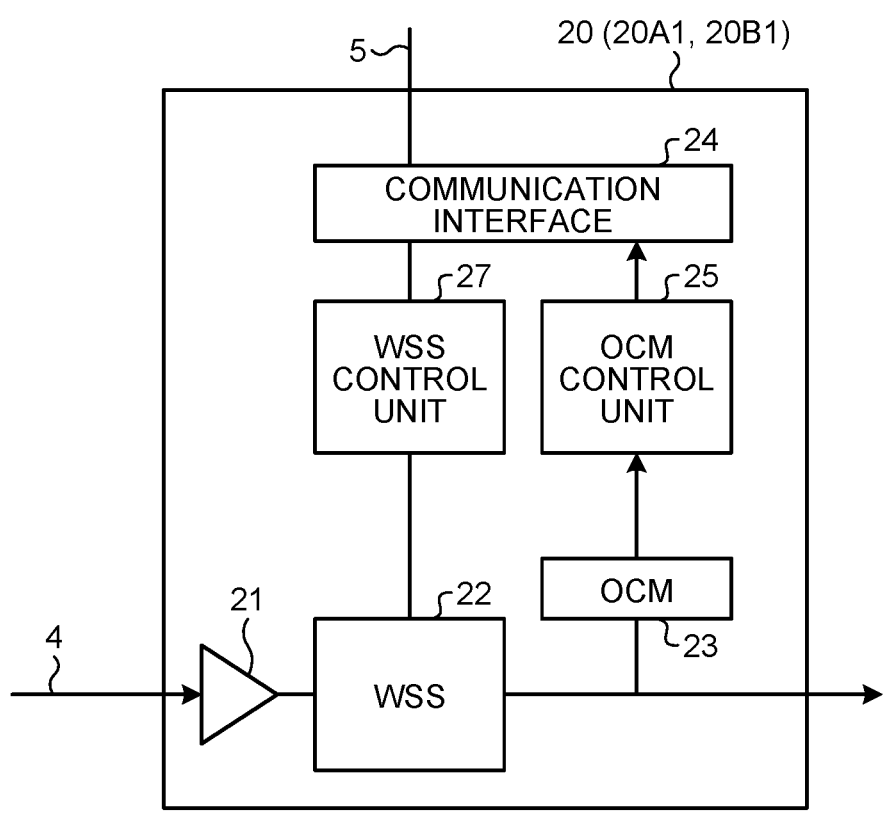
FIG. 11 is a diagram illustrating an example of a receiving device.

FIG. 11 is a diagram illustrating an example of the receiving device 20A1. The receiving device 20A1 illustrated in FIG. 11 has an optical amplifier 21, a WSS 22, an OCM 23, a communication interface 24, an OCM control unit 25, and a WSS control unit 27. The OCM control unit 25 obtains spectral data for dummy wavelength light measured by the OCM 23 and notifies the control device 3A of the spectral data for the dummy wavelength light via the communication interface 24 by using a control line 5.

Figure 12:
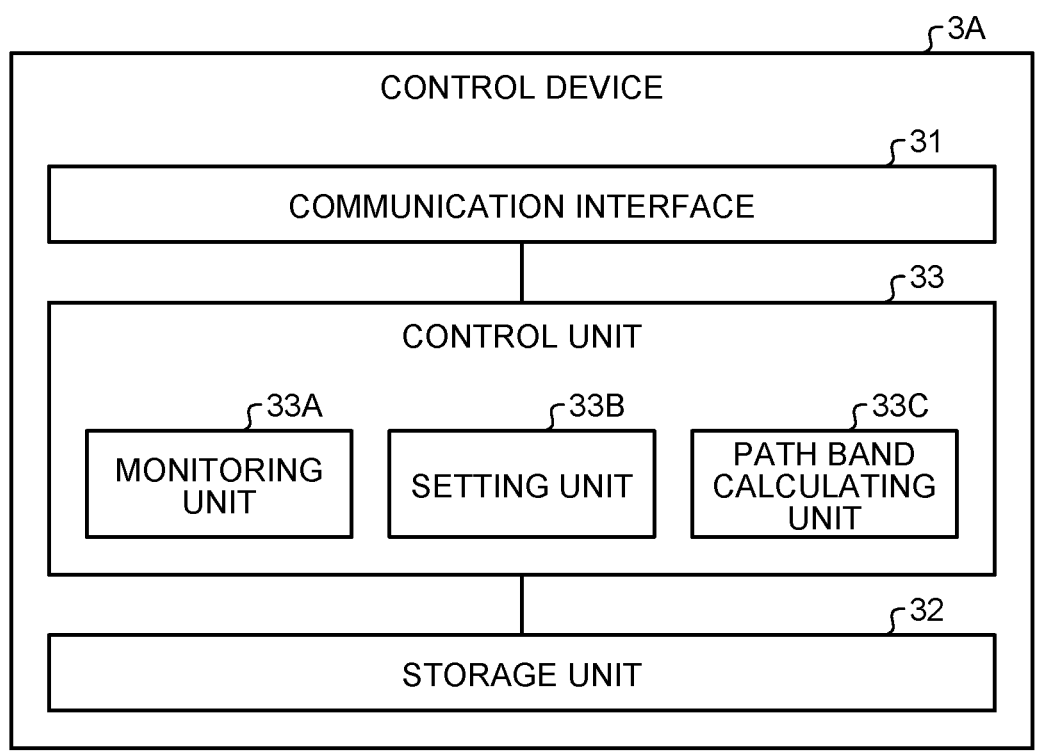
FIG. 12 is a diagram illustrating an example of a control device.

FIG. 12 is a diagram illustrating an example of the control device 3A. The control device 3A illustrated in FIG. 12 has a communication interface 31, a storage unit 32, and a control unit 33. The control unit 33 has a monitoring unit 33A, a setting unit 33B, and the path band calculating unit 33C. In a case where the spectral data for the dummy wavelength light has been obtained by use of the control line 5, the path band calculating unit 33C calculates path band monitor values representing a band state of the operational path from the spectral data for the dummy wavelength light.

Figure 13:
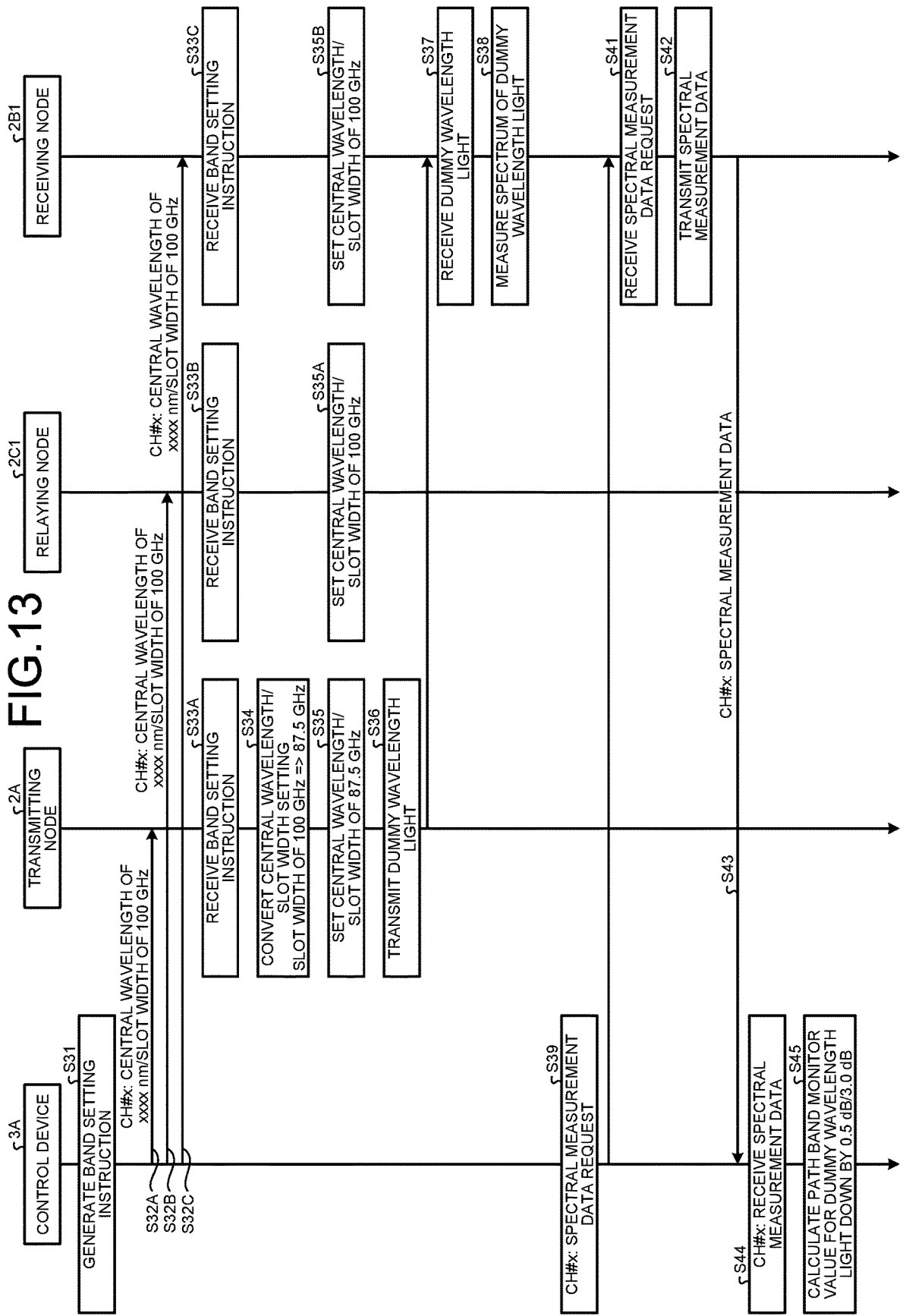
FIG. 13 is a sequence diagram illustrating an example of processing operation in the optical transmission system, the processing operation being related to path band monitoring processing according to the second embodiment.
Figure 14:
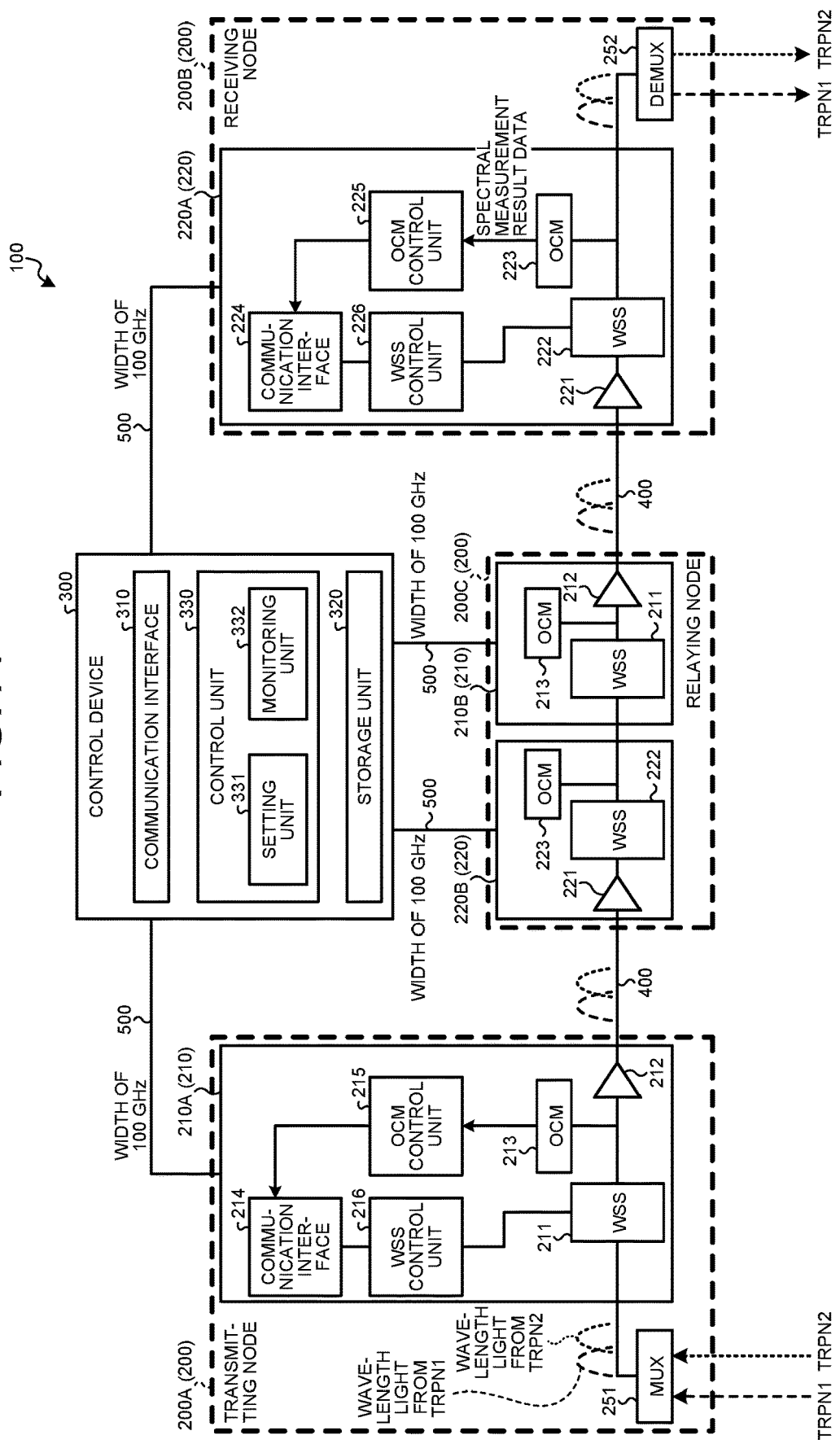
FIG. 14 is a diagram illustrating an example of a conventional optical transmission system.

Operation of the optical transmission system 1A according to the second embodiment will be described next. FIG. 13 is a sequence diagram illustrating an example of processing operation of the optical transmission system 1A, the processing operation being related to path band monitoring processing according to the second embodiment. The path band monitoring processing illustrated in FIG. 13 is processing of transmitting, from a transmitting node 2A, dummy wavelength light from the ASE light source 13, and notifying, from a receiving node 2B1, the control device 3A of spectral data for the dummy wavelength light.

Furthermore, the path band monitoring processing is processing of monitoring, at the control device 3A, a band state of the dummy wavelength light on the basis of spectral data for the dummy wavelength light. For convenience of explanation, it is assumed that no transponders TRPN have been connected to the transmitting node 2A and the receiving node 2B1 in the optical transmission system 1A.

The control device 3A generates a band setting instruction for a channel to be monitored (Step S31). The band setting instruction is a command for setting, for a WSS 11 and the WSS 22 at the nodes 2, a transmission band where the dummy wavelength light is transmitted through, the transmission band corresponding to the channel to be monitored. The band setting instruction corresponds to a central wavelength and a slot width of the dummy wavelength light. The slot width is set as a first slot width to be used during operation, for example, at 100 GHz.

By using a control line 5, the control device 3A transmits the band setting instruction for the channel to be monitored, to the transmitting node 2A in the optical transmission system 1A (Step S32A). Furthermore, by using a control line 5, the control device 3A transmits the band setting instruction for the channel to be monitored, to a relaying node 2C1 in the optical transmission system 1A (Step S32B). In addition, by using the control line 5, the control device 3A transmits the band setting instruction for the channel to be monitored, to the receiving node 2B1 in the optical transmission system 1A (Step S32C).

In a case where the band setting instruction from the control device 3A is received at the transmitting node 2A by use of the control line 5 (Step S33A), the first slot width of the central wavelength in the band setting instruction is converted to a second slot width (Step S34). The second slot width is 87.5 GHz narrower than 100 GHz, which is set for operation, by 12.5 GHz. Furthermore, at the transmitting node 2A, the converted central wavelength and second slot width are set for the WSS 11 (Step S35). As a result, the WSS 11 at the transmitting node 2A transmits therethrough and outputs dummy wavelength light having the second slot width of 87.5 GHz around the central wavelength, from the ASE light.

In a case where the band setting instruction is received at the relaying node 2C from the control device 3A by use of the control line 5 (Step S33B), the central wavelength and first slot width in the band setting instruction are set for the WSS 11 and WSS 22 (Step S35A). The first slot width is, for example, 100 GHz, which is used upon operation. As a result, the WSS 11 and WSS 22 at the relaying node 2C will transmit therethrough the dummy wavelength light.

In a case where the band setting instruction is received at the receiving node 2B1 from the control device 3A by use of the control line 5 (Step S33C), the central wavelength and first slot width in the band setting instruction are set for the WSS 22 (Step S35B). As a result, the WSS 22 at the receiving node 2B1 will transmit therethrough the dummy wavelength light.

After the transmission band having the central wavelength and the second slot width has been set for the WSS 11 at the transmitting node 2A at Step S35, the ASE light from the ASE light source 13 is transmitted through the WSS 11 and dummy wavelength light is thereby generated and transmitted to the optical waveguide 4 (Step S36).

In a case where the dummy wavelength light is received from the transmitting node 2A through the optical waveguide 4 (Step S37), the OCM control unit 25 at the receiving node 2B1 obtains spectral data for the dummy wavelength light, the spectral data being measured by the OCM 23 (Step S38).

By using the control line 5, the control device 3A transmits a spectral data request to the receiving node 2B1 (Step S39). In a case where the spectral data request from the control device 3A is received at the receiving node 2B1 by use of the control line 5 (Step S41), the spectral data for the dummy wavelength light for the channel to be monitored is transmitted, by use of the control line 5, from the receiving node 2B1 to the control device 3A (Steps S42 and S43).

The path band calculating unit 33C in the control device 3A receives the spectral data for the channel to be monitored, by using the control line 5 (Step S44). On the basis of the obtained spectral data for the channel to be monitored, the path band calculating unit 33C calculates path band monitor values at values down by 0.5 dB and 3.0 dB from the peak of the dummy wavelength light (Step S45) and the processing operation illustrated in FIG. 13 is ended. As a result, the control device 3A obtains the path band monitor values for the dummy wavelength light of the channel to be monitored. On the basis of the path band monitor values for the channel to be monitored corresponding to the dummy wavelength light, the control device 3A is able to evaluate the state of communication through the operational path even before installation of transponders.

The transmitting node 2A according to the second embodiment has the WSS 11 that generates dummy wavelength light from the ASE light emitted by the ASE light source 13 and that outputs the dummy wavelength light. At the receiving node 2B1, spectral data for the dummy wavelength light passed in the optical waveguide 4 is extracted by the OCM 23 and the control device 3A is notified of the extracted spectral data for the dummy wavelength light. At the control device 3A, path band monitor values for the operational path are calculated from the extracted spectral data for the dummy wavelength light. As a result, even in a state where no transponders have been connected, the control device 3A is able to obtain the path band monitor values for the operational path.

The control device 3A has the path band calculating unit 33C. As a result, the calculation processing load on the receiving node 2B1 is able to be reduced.

In the above described example, path band monitor values for dummy wavelength light using ASE light are calculated in the optical transmission system 1A before installation of transponders TRPN, but this example may be modified as appropriate. For example, path band monitor values for dummy wavelength light that is wavelength light that has not been used may be calculated during operation.

Furthermore, the case where path band monitor values for the operational path between the transmitting node 2A and the receiving node 2B1 are obtained has been described as an example. However, at the control device 3A, path band monitor values may be calculated on the basis of spectral data for dummy wavelength light from a receiving device 20B1 at the relaying node 2C1. As a result, path band monitor values for the operational path between the transmitting node 2A and the relaying node 2C1 are able to be obtained. The WSS 11 in a transmitting device 10B at the relaying node 2C1 may generate dummy wavelength light from the ASE light and the control device 3A may calculate path band monitor values on the basis of spectral data for the dummy wavelength light from the receiving device 20A1. As a result, path bad monitor values for the operational path between the relaying node 2C1 and the receiving node 2B1 are able to be obtained.

According to an aspect, in a state where no transponders have been connected, a band state of an operational path is able to be obtained.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmission system, including:
   a transmitting node that transmits wavelength light of an operational path to an optical waveguide; and
   a receiving node that receives the wavelength light from the optical waveguide, wherein
   the transmitting node includes:
      a light source that generates spontaneously emitted light; and
      a wavelength selector that generates and outputs dummy wavelength light from the spontaneously emitted light generated by the light source,
   the receiving node includes an extractor that extracts spectral data of the dummy wavelength light passed in the optical waveguide, and
   the optical transmission system further comprises:
      an obtainer that obtains a band state of the operational path from the spectral data of the dummy wavelength light extracted by the extractor.

2. The optical transmission system according to claim 1, wherein the receiving node includes the obtainer.

3. The optical transmission system according to claim 1, further including:
   a control device that monitors the transmitting node and the receiving node, wherein the control device includes the obtainer.

4. The optical transmission system according to claim 1, wherein the extractor is an optical channel monitor that extracts the spectral data of the dummy wavelength light by utilizing optical coherent interference.

5. The optical transmission system according to claim 4, wherein the obtainer obtains the band state that is a band width at a value down, by a predetermined value, from a peak value of the spectral data of the dummy wavelength light.

6. The optical transmission system according to claim 1, wherein the transmitting node outputs the dummy wavelength light in the wavelength light of the operational path in a state where no transponder has been connected to the transmitting node.

7. The optical transmission system according to claim 1, wherein the transmitting node outputs the dummy wavelength light having a wavelength different from that of wavelength light used by a transponder, in a state where the transponder has been connected to the transmitting node, the dummy wavelength light being in the wavelength light of the operational path.

8. The optical transmission system according to claim 1, wherein the wavelength selector generates, from the spontaneously emitted light, the dummy wavelength light having a second slot width narrower than a first slot width of the wavelength light.

9. A receiving device that receives wavelength light of an operation path via an optical waveguide from a transmitting node, the receiving device comprising:
   an extractor that extracts spectral data of dummy wavelength light generated from spontaneously emitted light at the transmitting node, from the dummy wavelength light passed through the optical waveguide; and
   an obtainer that obtains a band state of the operational path from the spectral data of the dummy wavelength light extracted by the extractor.

* * * * *